United States Patent
Irion et al.

(10) Patent No.: US 10,286,903 B2
(45) Date of Patent: May 14, 2019

(54) METHOD FOR CARRYING OUT AN AUTOMATIC PARKING PROCESS OF A VEHICLE

(71) Applicant: Robert Bosch GmbH, Stuttgart (DE)

(72) Inventors: Albrecht Irion, Stuttgart (DE); Hans-Joerg Mathony, Tamm-Hohenstange (DE); Rolf Nicodemus, Bietigheim-Bissingen (DE); Stefan Hoffmann, Bietigheim (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 61 days.

(21) Appl. No.: 15/518,045

(22) PCT Filed: Sep. 29, 2015

(86) PCT No.: PCT/EP2015/072342
§ 371 (c)(1),
(2) Date: Apr. 10, 2017

(87) PCT Pub. No.: WO2016/066355
PCT Pub. Date: May 6, 2016

(65) Prior Publication Data
US 2017/0313305 A1   Nov. 2, 2017

(30) Foreign Application Priority Data
Oct. 27, 2014   (DE) .................. 10 2014 221 754

(51) Int. Cl.
*B60W 30/06* (2006.01)
*G08G 1/0967* (2006.01)
(Continued)

(52) U.S. Cl.
CPC ....... *B60W 30/06* (2013.01); *G08G 1/096725* (2013.01); *G08G 1/096741* (2013.01);
(Continued)

(58) Field of Classification Search
None
See application file for complete search history.

(56) References Cited

U.S. PATENT DOCUMENTS 9,581,997 B1 *   2/2017   Penilla ................ G05D 1/0011
2010/0156672 A1   6/2010   Yoo et al.
(Continued)

FOREIGN PATENT DOCUMENTS

DE   102010064015 A1   6/2012
DE   102011084124 A1   4/2013
(Continued)

OTHER PUBLICATIONS

Hanif et al., "Smart Parking Reservation System using Short Message Services (SMS)", Electrical and Electronic Engineering Department, Universiti Teknologi PETRONAS, Malaysia, 2010 (Year: 2010).*

(Continued)

*Primary Examiner* — Tamara L Weber
(74) *Attorney, Agent, or Firm* — Norton Rose Fulbright US LLP; Gerard Messina

(57) ABSTRACT

A method (and corresponding parking facility management server, parking system, and computer program) for carrying out an automatic parking process of a vehicle includes a reservation request for a parking position of a parking facility being sent to a parking facility management server via a communication network, navigation data for an autonomous navigation to the reserved parking position corresponding to the reservation request being received by the vehicle via the communication network, and the vehicle (Continued)

autonomously navigating in the parking facility to the reserved parking position based on the navigation data. It is preferably provided that the vehicle autonomously pulls into the parking position, pulls out of this parking position, and travels back to a drop-off position or pick-up position, from which a driver of the vehicle may pick up the vehicle.

21 Claims, 2 Drawing Sheets

(51) Int. Cl.
    *G08G 1/0968* (2006.01)
    *G08G 1/14* (2006.01)
    *G08G 1/16* (2006.01)

(52) U.S. Cl.
    CPC . *G08G 1/096775* (2013.01); *G08G 1/096816* (2013.01); *G08G 1/096838* (2013.01); *G08G 1/142* (2013.01); *G08G 1/148* (2013.01); *G08G 1/168* (2013.01)

(56) References Cited

U.S. PATENT DOCUMENTS

| | | |
|---|---|---|
| 2012/0092190 A1 | 4/2012 | Stefik et al. |
| 2012/0188100 A1 | 7/2012 | Min et al. |
| 2013/0231824 A1 | 9/2013 | Wilson et al. |
| 2014/0358596 A1* | 12/2014 | Brown .................. G06Q 50/30 705/5 |
| 2016/0371982 A1 | 12/2016 | Arndt et al. |

FOREIGN PATENT DOCUMENTS

| | | |
|---|---|---|
| DE | 102011088809 A1 | 6/2013 |
| DE | 102012222562 A1 | 6/2014 |
| DE | 102013213379 A1 | 1/2015 |
| JP | 2000092622 A | 3/2000 |
| JP | 2003021519 A | 1/2003 |
| JP | 2005031766 A | 2/2005 |
| JP | 2007219738 A | 8/2007 |
| JP | 2011054116 A | 3/2011 |

OTHER PUBLICATIONS

International Search Report dated Dec. 23, 2015 of the corresponding International Application PCT/EP2015/072342 filed Sep. 29, 2015.

* cited by examiner

METHOD FOR CARRYING OUT AN AUTOMATIC PARKING PROCESS OF A VEHICLE

CROSS-REFERENCE TO RELATED APPLICATIONS

The present application is the national stage of International Pat. App. No. PCT/EP2015/072342 filed Sep. 29, 2015, and claims priority under 35 U.S.C. § 119 to DE 10 2014 221 754.7, filed in the Federal Republic of Germany on Oct. 27, 2014, the content of each of which is incorporated herein by reference in its entirety.

FIELD OF THE INVENTION

The present invention relates to a method for carrying out an automatic parking process of a vehicle. The present invention further relates to a parking facility management server for a parking facility. The present invention further relates to a method for operating a parking facility management server. The present invention further relates to a device for carrying out a reservation of a parking position of a parking facility. The present invention also relates to a method for operating the device for carrying out a reservation of a parking position of a parking facility. The present invention further relates to a parking system for vehicles. The present invention also relates to a computer program.

BACKGROUND

In a case of fully automated valet parking, the vehicle is parked by a driver at a drop-off position (for example, in front of a parking garage) and, from there, the vehicle automatically travels into a parking position/parking space and, from there, back to the drop-off position.

SUMMARY

An object of the present invention is to provide an improved automatic parking process of a vehicle.

According to one aspect, a method for carrying out an automatic parking process of a vehicle includes a reservation request for a parking position of a parking facility being sent to a parking facility management server via a communication network, navigation data for an autonomous navigation to the reserved parking position corresponding to the reservation request being received by the vehicle via the communication network, and the vehicle autonomously navigating in the parking facility to the reserved parking position based on the navigation data.

According to yet another aspect, a parking facility management server for a parking facility includes a communication interface which is designed for receiving a reservation request for a parking position of a parking facility for a vehicle via a communication network, and a processor which is designed for ascertaining a parking position and navigation data for an autonomous navigation in the parking facility to the reserved parking position depending on the reservation request, the communication interface being designed for transmitting the navigation data to the vehicle via the communication network.

According to yet another aspect, a method for operating the parking facility management server includes the communication interface receiving a reservation request via the communication network, the processor ascertaining a parking position and navigation data for an autonomous navigation in the parking facility to the reserved parking position depending on the reservation request, and the communication interface transmitting the navigation data to the vehicle via the communication network.

According to yet another aspect, a device for carrying out a reservation of a parking position of a parking facility includes a processor designed for ascertaining a reservation request for a parking position of a parking facility for a vehicle, and a communication interface designed for transmitting the reservation request to a parking facility management server via a communication network.

According to yet another aspect, a method for operating the device according to the present invention includes a processor ascertaining a reservation request for a parking position of a parking facility for a vehicle, and a communication interface transmitting the reservation request to the parking facility management server via a communication network.

According to yet another aspect, a parking system for vehicles includes a parking facility including multiple parking positions and the described parking facility management server and/or the described device.

According to yet another aspect, a computer program includes program code for carrying out the method according to the present invention for carrying out an automatic parking process of a vehicle and/or for carrying out a method for operating the parking facility management server according to the present invention and/or for carrying out the method for operating the device according to the present invention when the computer program is run on a computer.

According to one aspect, a vehicle is provided, which is configured for carrying out the method for carrying out an automatic parking process of a vehicle.

The present invention therefore includes, inter alia, transmitting a reservation request for a parking position of a parking facility to a parking facility management server. This parking facility management server is thereby advantageously enabled to reserve a parking position for the vehicle in response to the reservation request. A reserved parking position is therefore already advantageously available for the vehicle when the vehicle arrives at the parking facility. Therefore, the vehicle advantageously does not need to wait unnecessarily for an autonomous parking process to begin. A waiting time at the parking facility is therefore advantageously reduced. A concept for efficiently and effectively carrying out an automatic parking process is therefore created.

According to one specific embodiment, it is provided that, when an anticipated arrival time of the vehicle at the parking facility is later than a parking start time included in the transmitted reservation request, a reservation modification request is transmitted to the parking facility management server via the communication network in order to be able to modify the reservation. This yields the technical advantage, in particular, that the vehicle receives a reserved parking position even in the event of a delay of the vehicle with respect to an arrival of the vehicle at the parking facility.

In yet another specific embodiment, it is provided that the reservation request includes one or several of the following parking parameters: parking duration, start of parking, end of parking, size of the parking position, woman's parking position, family parking position, parking position having a charging station for electric vehicles, parking position having a monitoring function, payment function. Providing such parking parameters yields the technical advantage, in particular, that the parking facility management server can ascertain a precisely suitable parking position for the vehicle.

In yet another specific embodiment, it is provided that the navigation data include one or several of the following pieces of data: map data from a digital map of the parking facility, route data regarding a route to be traveled in the parking facility, traffic data relating to one or several permissible maximum speeds in the parking facility and/or right-of-way rules applying in the parking facility and/or critical areas in the parking facility. Providing such data yields the technical advantage, in particular, that an autonomous navigation can be efficiently carried out.

In yet another specific embodiment of the parking facility management server, the communication interface is designed for receiving a reservation modification request, including an anticipated arrival time of the vehicle at the parking facility, at the parking facility management server via the communication network, the processor being designed for modifying the reservation with respect to the anticipated arrival time depending on the reservation modification request.

According to one specific embodiment, a monitoring system includes a video sensor system and/or parking facility occupancy sensors and/or photoelectric barriers.

Providing a monitoring system yields the technical advantage, in particular, that monitoring the autonomous travel of the vehicle in the parking facility is made possible.

According to one specific embodiment, the monitoring system is designed for documenting, in particular recording, the parking process and/or the autonomous travel of the vehicle in the parking facility.

Photoelectric barriers are preferably provided at the parking position, so that the photoelectric barriers may detect a vehicle pulling into or out of the parking position.

According to one specific embodiment, it is provided that, after the vehicle pulls out of the parking position, i.e., for example, after a corresponding detection with the aid of the photoelectric barriers, the parking position is classified as being available, i.e., not occupied. The parking position is therefore cleared after the vehicle has pulled out of the parking position.

An electronic occupancy status is set to available or occupied according to the occupancy, preferably with the aid of the processor.

In yet another specific embodiment of the parking facility management server, the processor is designed for ascertaining a start signal for starting the vehicle once a parking time included in the reservation request is exceeded, the communication interface being designed for transmitting the start signal to the parked vehicle via the communication network. This yields the technical advantage, in particular, that the vehicle is automatically started after expiration of the reservation of the reserved parking space and is therefore advantageously enabled to autonomously return to a drop-off position at which a driver of the vehicle may pick up the vehicle again.

According to one specific embodiment, the ascertainment of the start signal and the transmission of the start signal to the vehicle via the communication network can also be carried out in response to a start request. This means it is provided in yet another specific embodiment of the parking facility management server that the processor is designed for ascertaining a start signal for starting the vehicle in response to a start request, the communication interface being designed for transmitting the start signal to the parked vehicle via the communication network. Such a start request can be received via the communication network with the aid of the communication interface, for example. The start request can be sent from a mobile terminal, for example, a smartphone, to the parking facility management server via the communication network. A user of the vehicle can therefore start his/her vehicle already before the expiration of the planned parking time, so that the vehicle autonomously travels back to the drop-off position before expiration of the planned parking time.

Functionalities of the methods similarly result from the functionalities of the corresponding devices or in accordance with the parking facility management server and the parking system, and vice versa.

This therefore means, in particular, that the device for carrying out a reservation of a parking position in a parking facility is designed according to one specific embodiment for carrying out the method for carrying out an automatic parking process of a vehicle.

A parking facility within the scope of the present invention may also be referred to as a parking area and is used as an area for parking vehicles. The parking facility therefore forms, in particular, one contiguous area which includes multiple parking spaces (in the case of a parking facility on private property) or parking zones (in the case of a parking facility on public property). According to one specific embodiment, the parking facility may include a parking deck. In particular, the parking facility includes a parking garage.

"Autonomously" within the scope of the present invention means, in particular, that the vehicle navigates or travels automatically, i.e., without any intervention by a driver. The vehicle therefore automatically travels in the parking facility without a driver needing to steer the vehicle for this purpose. The driver no longer needs to be located in the vehicle. Such an autonomously traveling vehicle, which can automatically pull into and out of a parking space, is referred to, for example, as an automatic valet parking (AVP) vehicle and its automated parking may be referred to as "automatic parking process." Vehicles which do not have this AVP functionality are referred to as normal vehicles, for example.

A drop-off position within the scope of the present invention is a position at which a driver of the vehicle may stop his/her vehicle for an autonomous parking process and at which the driver may pick up his/her vehicle at a later point in time.

A parking position within the scope of the present invention is a position at which the vehicle is supposed to autonomously park.

In one specific embodiment, it is provided that the vehicle autonomously navigates from the drop-off position to the parking position.

In yet another specific embodiment, it is provided that the vehicle autonomously pulls into the parking position.

In yet another specific embodiment, it is provided that the vehicle autonomously pulls out of the parking position.

According to yet another specific embodiment, it is provided that the vehicle autonomously navigates from the parking position to the drop-off position.

In one specific embodiment of the parking facility management server, the processor is designed for controlling a monitoring system for monitoring and/or documenting autonomous travel of the vehicle in the parking facility and/or a movement of the vehicle into and/or out of a parking space in the parking facility.

According to one specific embodiment, a route to the parking space is ascertained, the vehicle autonomously traveling the ascertained route to the parking space.

According to one specific embodiment, the vehicle autonomously travels from the parking position to a pick-up position at which a driver of the vehicle may pick up the vehicle. The pick-up position corresponds to the drop-off position, for example.

According to one specific embodiment, information (for example, a digital map of the parking position and/or the parking facility) is made available to the vehicle, for example, via the communication network, the vehicle autonomously traveling in the parking facility, in particular to the parking position, based on the information.

The present invention is explained in greater detail in the following with reference to preferred exemplary embodiments.

DETAILED DESCRIPTION

Figure 1:
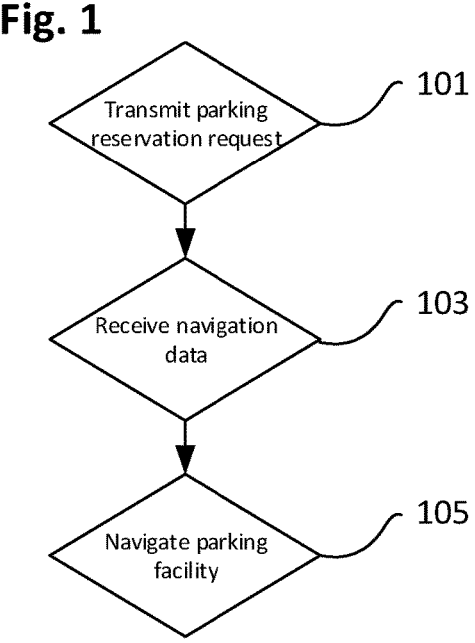
FIG. 1 is a flowchart that illustrates a method for carrying out an automatic parking process of a vehicle, according to an example embodiment of the present invention.

FIG. 1 is a flowchart that illustrates a method for carrying out an automatic parking process of a vehicle, according to an example embodiment. In a step 101, a reservation request for a parking position of a parking facility is sent or transmitted to a parking facility management server via a communication network. In a step 103, navigation data for an autonomous navigation to the reserved parking position corresponding to the reservation request is received by the vehicle via the communication network. The vehicle autonomously navigates, according to a step 105, in the parking facility to the reserved parking position based on the navigation data.

According to one specific embodiment, the parking facility management server ascertains a parking position for the vehicle in response to the reservation request and transmits corresponding navigation data to the vehicle.

Figure 2:
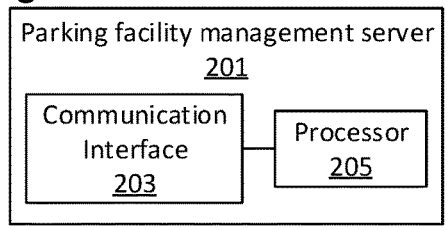
FIG. 2 shows a parking facility management server for a parking facility, according to an example embodiment of the present invention.

FIG. 2 shows a parking facility management server 201 for a parking facility, according to an example embodiment. The parking facility management server 201 includes a communication interface 203 which is designed for receiving a reservation request for a parking position of a parking facility for a vehicle via a communication network. Parking facility management server 201 further includes a processor 205 which is designed for ascertaining a parking position and navigation data for an autonomous navigation in the parking facility to the reserved parking position depending on the reservation request, communication interface 203 being designed for transmitting the navigation data to the vehicle via the communication network.

According to one specific embodiment, the communication network includes a WLAN network and/or a mobile network.

Figure 3:
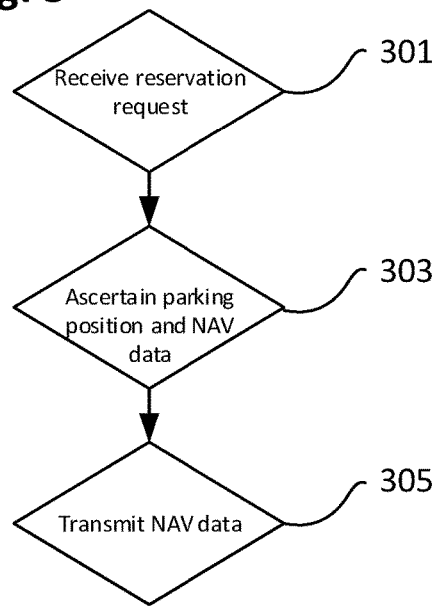
FIG. 3 is a flowchart that illustrates a method for operating a parking facility management server of FIG. 2, according to an example embodiment of the present invention.

FIG. 3 is a flowchart of that illustrates a method for operating the parking facility management server of FIG. 2, according to an example embodiment. In a step 301, communication interface 203 receives a reservation request via the communication network. Processor 205 ascertains in a step 303 a parking position and navigation data for an autonomous navigation in the parking facility to the reserved parking position depending on the reservation request. In a step 305, communication interface 203 transmits or sends the navigation data to the vehicle via the communication network.

Figure 4:
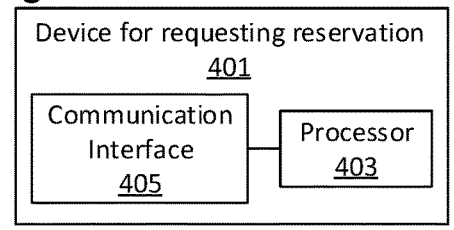
FIG. 4 shows a device for carrying out a reservation of a parking position, according to an example embodiment of the present invention.

FIG. 4 shows a device 401 for carrying out a reservation of a parking position of a parking facility, according to an example embodiment. Device 401 includes a processor 403 which is designed for ascertaining a reservation request for a parking position of a parking facility for a vehicle. Device 401 includes a communication interface 405 which is designed for transmitting the reservation request via a communication network to a parking facility management server, for example, to parking facility management server 201 of FIG. 2.

According to one specific embodiment, the device is a mobile communications device, in particular a mobile phone, in particular a smartphone.

Figure 5:
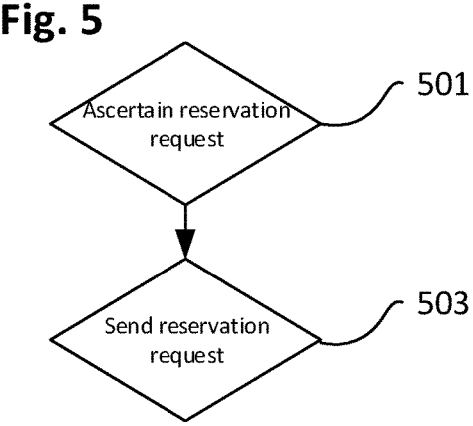
FIG. 5 is a flowchart that illustrates a method for operating the device of FIG. 4, according to an example embodiment of the present invention.

FIG. 5 is a flowchart that illustrates a method for operating device 401 of FIG. 4, according to an example embodiment. In a step 501, processor 403 ascertains a reservation request for a parking position of a parking facility for a vehicle. Communication interface 405 transmits or sends, according to a step 503, the reservation request to the parking facility management server via the communication network.

Figure 6:
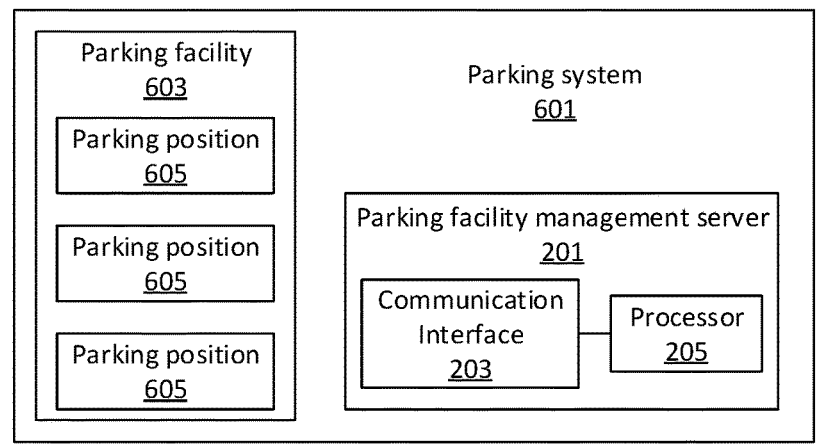
FIG. 6 shows a parking system for vehicles, according to an example embodiment of the present invention.

FIG. 6 shows a parking system 601 for vehicles, according to an example embodiment. Parking system 601 includes a parking facility 603 including multiple parking positions 605. Parking system 601 includes parking facility management server 201 from FIG. 2.

In one specific embodiment, which is not depicted, parking system 601 includes device 401 from FIG. 4 instead of or in addition to parking facility management server 201.

The present invention therefore includes, in particular, the idea of providing a technical concept, with the aid of which a parking position is reserved in a parking facility, is autonomously (i.e., in a fully automated manner or fully automatically) approached (pulled into for parking), and is subsequently made available again (pulled out of). Therefore, an automatic parking process, which is also referred to as automatic valet parking, is improved.

One exemplary sequence of an AVP process is described in the following, the individual features of which can be provided either alone or in arbitrary combination. A parking facility management system includes, in particular, the parking facility management server according to the present invention.

Before the start of the trip or at the beginning of the trip, the user reserves a parking position in a parking garage or in a parking lot, for example, via a program (integrated in the vehicle system such as a head unit and/or as an app on a mobile device (for example, a smartphone) and/or on a PC). The reservation request is therefore ascertained here.

Possible premises/determining factors during the booking may be the following, for example: time; size of the parking space (e.g., a Smart car versus a BMW 7 Series); parking space for women/families; parking space with charging station for electric vehicles; parking space with monitoring capability (e.g., via video and mobile phone app); and/or payment conditions (e.g., credit card or cash).

The parking facility management system (i.e., the parking facility management server) reserves the parking space or the parking position on the basis of the data/determining factors.

The trip to the parking facility then begins.

For example, according to an example embodiment, a system (integrated in the vehicle, as an app on a mobile terminal, or stored on a server (back end)) calculates the fastest/best route to the parking facility or the parking garage taking into consideration the present traffic (the vehicle preferably autonomously navigates to the parking facility). A navigation system (external to the vehicle or internal to the vehicle) therefore preferably ascertains the route to the parking facility.

According to an example embodiment, a fully automated (autonomous) function (AVP) drives the vehicle to the parking garage/parking facility. The vehicle therefore autonomously travels from a drop-off position to the parking position and autonomously pulls into this parking position, as described in the following.

In this context, the vehicle preferably utilizes driver assistance systems with respect to highly/fully automated traveling and parking systems, object detection systems, collision monitoring systems, etc.

If a delay with respect to the arrival at the parking garage is established by the system or by the driver, the reservation is modified (automatically by the system). A reservation modification request is therefore ascertained here.

In the parking garage or the parking lot, the vehicle is dropped off by the driver at a "dropping zone" (drop-off position). The driver may leave his/her vehicle after dropping it off.

The parking process then begins.

For example, according to an example embodiment, the parking facility management transmits the reserved parking space (parking position) and necessary data for the trip to the parking space/parking position to the vehicle (e.g., via WLAN). The data can include, for example, a digital map of the parking garage, the path or route to be traveled, general conditions to be observed (maximum speeds, rights of way, critical areas, etc.), etc. The vehicle travels to the parking space/parking position in a highly/fully automated manner (autonomously) without a driver, with the aid of the transmitted data. This means that the vehicle travels autonomously from the drop-off position to the parking position based on the transmitted data.

In this context, the vehicle utilizes, in particular, driver assistance systems with respect to highly/fully automated traveling and parking systems, object detection systems, collision monitoring systems, etc.

In an example, the parking facility management sets the status of the parking space to "occupied." This means that the parking facility management server, in particular the processor, sets the status of the parking position to "occupied."

It is preferably or optionally provided that the parking facility management monitors the traveling process and the parking process with the aid of an internal infrastructure (video sensor system, parking space occupancy sensors, etc.). This takes place, in particular, with the aid of a monitoring system.

It is preferably or optionally provided that, in the case of an electric vehicle and a reserved/booked charging parking space, the charging process starts after the maneuver into the parking position is completed. This means it is provided according to one specific embodiment that a charging process for an electric vehicle automatically starts after the vehicle has pulled into the parking position.

In an example, provided the charging process has ended before the vehicle is picked up, the vehicle is reparked by the parking facility management system into a normal parking space (process as described above). This means that the processor ascertains a start signal which is sent with the aid of the communication interface to the vehicle via the communication network, and the vehicle may therefore start. The processor further ascertains a reparking route to a new parking position, which is also sent to the vehicle with the aid of the communication interface. The vehicle can therefore be autonomously reparked. The parking position including a charging station is therefore available to other electric vehicles.

A conclusion of the parking process can then be performed.

In this regard, preferably or optionally, if the reserved parking time has been exceeded, the parking facility management system (parking facility management server) informs the driver (e.g., via a mobile terminal).

In an example, the driver requests that the vehicle be returned (e.g., via the mobile terminal or via the system at the parking garage/parking facility).

The parking facility management activates (starts) the vehicle. Here, the starting signal is therefore sent to the vehicle. Either from the server or the mobile terminal of the driver.

The parking facility management transmits the necessary data for the trip (see above) to the drop-off zone to the vehicle (e.g., via WLAN). Such data are analogous to the data which were transmitted to the vehicle as described above in conjunction with the trip from the drop-off position to the parking position.

The vehicle travels in a highly/fully automated manner (autonomously) without a driver, with the aid of the transmitted data, to the drop-off zone. This means the vehicle pulls autonomously out of the parking position and autonomously travels back to the drop-off position.

The parking facility management sets the status of the parking space or the parking position to "available."

The driver picks up the vehicle at the drop-off position.

The entire data traffic between the vehicle, the mobile terminal, for example, mobile telephone, and the parking facility management system (parking facility management server) is preferably encrypted in this case.

In summary, the present invention efficiently provides for a parking position to be reserved, autonomously approached (autonomous trip to the parking facility, autonomous trip from the drop-off position to the parking position, and autonomously pulling into the parking position), and made available again (autonomously pulling out of the parking position, autonomously traveling from the parking position to the drop-off position).

What is claimed is:

1. A method for controlling an automatic parking process of a vehicle, the method comprising:
sending, by the vehicle and via a communication network, a reservation request for a parking position of a parking facility to a parking facility management server;
receiving, by the vehicle and via the communication network, navigation data for an autonomous navigation to the reserved parking position corresponding to the reservation request; and the vehicle autonomously navigating in the parking facility to the reserved parking position based on the navigation data;

wherein either:

(a) the vehicle is an electric vehicle, the parking position includes a charging function for charging a vehicle battery, and the method further comprises (1) automatically starting a charging process for the electric vehicle using the charging function after the vehicle has pulled into the parking position and (2) responsive to completion of the charging process, autonomously re-parking the vehicle into a new parking position; or (b) the method further includes, (1) receiving from the parking facility management server a start signal sent by the parking facility management server in response to a parking time included in the reservation request being exceeded, and (2) the vehicle responding to the start signal by autonomously navigating the parking facility away from the reserved parking position.

2. The method of claim 1, further comprising:

when an anticipated arrival time of the vehicle at the parking facility is later than a parking start time included in the transmitted reservation request, transmitting a reservation modification request to the parking facility management server via the communication network in order to be able to modify the reservation.

3. The method of claim 1, wherein the reservation request includes one or more of the following parking parameters: parking duration, start of parking, end of parking, size of the parking position, woman's parking position, family parking position, parking position having a charging station for electric vehicles, parking position having a monitoring function, and payment function.

4. The method of claim 1, wherein the navigation data include one or more of the following data: map data from a digital map of the parking facility, route data regarding a route to be traveled in the parking facility, traffic data relating to at least one of one or more permissible maximum speeds in the parking facility and right-of-way rules that apply in the parking facility or in critical areas of the parking facility.

5. The method of claim 1, wherein a route to the parking space is ascertained, the vehicle autonomously traveling the ascertained route to the parking space.

6. The method of claim 1, wherein the vehicle is the electric vehicle, the parking position includes the charging function for charging the vehicle battery, and the method further comprises the automatic starting charging process for the electric vehicle after the vehicle has pulled into the parking position.

7. The method of claim 6, wherein the method further comprises, after the charging process is completed, the autonomous re-parking the vehicle into the new parking position.

8. The method of claim 1, further comprising receiving additional information and the vehicle autonomously traveling to the parking position based also on the additional information.

9. The method of claim 1, further comprising the vehicle at least one of autonomously pulling into the parking position and autonomously pulling out of the parking position.

10. The method of claim 1, wherein the method includes the receiving from the parking facility management server the start signal sent by the parking facility management server in response to the parking time included in the reservation request being exceeded, and the vehicle responding to the start signal by autonomously navigating the parking facility away from the reserved parking position.

11. A parking facility management server for a parking facility, the server comprising:

a communication interface to a communication network; and a processor;

wherein:

the processor is configured to:

receive, via the communication interface, a reservation request for a parking position of a parking facility for a vehicle;

responsive to the request, ascertain the parking position and navigation data for an autonomous navigation in the parking facility to the parking position; and transmit the navigation data to the vehicle and via the communication interface; and one or both of the following:

(a) the parking position includes a charging function for charging a vehicle battery of the vehicle, and the processor is configured to, responsive to completion of a charging process that is automatically started for charging the vehicle with the charging function after the vehicle has pulled into the parking position, control the vehicle to begin an autonomous re-parking of the vehicle into a new parking position; and (b) the processor is configured to, responsive to a parking time included in the reservation request being exceeded, control the vehicle to begin autonomously navigating the parking facility away from the reserved parking position.

12. The parking facility management server of claim 11, wherein the communication interface is configured to receive a reservation modification request, including a likely arrival time of the vehicle at the parking facility, and the processor is configured to modify the reservation with respect to the anticipated arrival time depending on the reservation modification request.

13. The parking facility management server of claim 11, wherein the processor is configured to control a monitoring system for at least one of monitoring and documenting at least one of autonomous travel of the vehicle in the parking facility, a movement of the vehicle into a parking space in the parking facility, and a movement of the vehicle out of the parking space in the parking facility.

14. The parking facility management server of claim 11, wherein the processor is configured to set an electronic occupancy status of the parking position to available or occupied according to an actual occupancy.

15. The parking facility management server of claim 11, wherein the processor is configured to:

reserve for the vehicle a parking position that includes the charging function for charging the vehicle battery; and automatically initiate the charging process after the vehicle has pulled into the parking position.

16. The parking facility management server of claim 11, wherein the parking position includes the charging function for charging the vehicle battery, and the processor is configured to, responsive to the completion of the charging process that is automatically started for charging the vehicle with the charging function after the vehicle has pulled into the parking position, control the vehicle to begin an autonomous re-parking of the vehicle into a new parking position.

17. The parking facility management server of claim 11, wherein the processor is configured to, responsive to the parking time included in the reservation request being exceeded, control the vehicle to begin autonomously navigating the parking facility away from the reserved parking position.

18. A method for operating a parking facility management server, the method comprising:
receiving, via a communication interface to a communication network, a reservation request for a parking position of a parking facility for a vehicle; and
responsive to the reservation request:
ascertaining, by processing circuitry, a parking position and navigation data for an autonomous navigation in the parking facility to the parking position; and
the processing circuitry transmitting the navigation data to the vehicle via the communication interface and communication network;
wherein either:
(a) the parking position includes a charging function for charging a vehicle battery of the vehicle, and the method further comprises, responsive to completion of a charging process that is automatically started for charging the vehicle battery with the charging function after the vehicle has pulled into the parking position, the processing circuitry controlling the vehicle to begin an autonomous re-parking of the vehicle into a new parking position; or
(b) the method further includes, responsive to a parking time included in the reservation request being exceeded, the processing circuitry controlling the vehicle to begin autonomously navigating the parking facility away from the reserved parking position.

19. A device for controlling parking in a parking facility, the device comprising:
a communication interface to a communication network; and
processing circuitry;
wherein:
the processing circuitry is configured to:
ascertain a reservation request for a parking position of the parking facility for a vehicle;
transmit the reservation request to a parking facility management server via the communication interface;
receive, via the communication interface and communication network, navigation data for an autonomous navigation to the reserved parking position corresponding to the reservation request; and
control the vehicle to autonomously navigate in the parking facility to the reserved parking position based on the navigation data;
the processing circuitry is configured to execute functions according to a running application; and
one or both of the following:
(a) the vehicle is an electric vehicle, the parking position includes a charging function for charging a vehicle battery, and the application is one that, when executed, causes the processing circuitry to receive, via the communication interface and communication network and responsive to completion of a charging process that is automatically started for charging the vehicle battery with the charging function after the vehicle has pulled into the parking position, a control signal responsive to which the processing circuitry is configured to control the vehicle to begin an autonomous re-parking of the vehicle into a new parking position; and
(b) (1) the application is one that, when executed, causes the processing circuitry to receive, from the parking facility management server and via the communication interface and communication network, a start signal sent by the parking facility management server in response to a parking time included in the reservation request being exceeded, and (2) the processing circuitry is configured to respond to the start signal by autonomously navigating the parking facility away from the reserved parking position.

20. A parking system for vehicles, the parking system comprising:
a parking facility including multiple parking positions; and
a parking facility management server that includes a processor and a communication interface to a communication network;
wherein:
the processor is configured to:
receive, via the communication interface, a reservation request for a parking position of the parking facility for a vehicle;
responsive to the request, ascertain the parking position and navigation data for an autonomous navigation in the parking facility to the parking position; and
transmit the navigation data to the vehicle and via the communication interface; and
one or both of the following:
(a) the parking position includes a charging function for charging a vehicle battery of the vehicle, and the processor is configured to, responsive to completion of a charging process that is automatically started for charging the vehicle battery with the charging function after the vehicle has pulled into the parking position, control the vehicle to begin an autonomous re-parking of the vehicle into a new parking position; and
(b) the processor is configured to, responsive to a parking time included in the reservation request being exceeded, control the vehicle to begin autonomously navigating the parking facility away from the reserved parking position.

21. A non-transitory computer-readable medium on which are stored instructions that are executable by a processor of a vehicle and that, when executed by the processor, cause the processor to perform a method for carrying out an automatic parking process of the vehicle, the method comprising:
sending a reservation request for a parking position of a parking facility to a parking facility management server;
receiving navigation data for an autonomous navigation to the reserved parking position corresponding to the reservation request; and
controlling the vehicle to autonomously navigate in the parking facility to the reserved parking position based on the navigation data;
wherein one or both of the following:
(a) the instructions are ones that, when executed, cause the processor to (1) receive, responsive to completion of a charging process that is automatically started for charging a battery of the vehicle after the vehicle pulls into the parking position, a control signal, and (2) according to the received control signal, control the vehicle to begin an autonomous re-parking of the vehicle into a new parking position; and (b) the instructions are ones that, when executed, cause the processor to (1) receive from the parking facility management server a start signal sent by the parking facility management server in response to a parking time included in the reservation request being exceeded, and (2) respond to the start signal by autonomously navigating the parking facility away from the reserved parking position.

\* \* \* \* \*